US012677802B2

(12) United States Patent
Daugherty et al.

(10) Patent No.: US 12,677,802 B2
(45) Date of Patent: Jul. 14, 2026

(54) CHEW TOY

(71) Applicant: 3TBrands, Inc., White Plains, NY (US)

(72) Inventors: Jonathan Daugherty, Clayton, OH (US); Richard White, Castle Rock, CO (US); Joel Robert Kaplan, Katonah, NY (US)

(73) Assignee: 3TBrands, Inc., White Plains, NY (US)

( * ) Notice: Subject to any disclaimer, the term of this patent is extended or adjusted under 35 U.S.C. 154(b) by 0 days.

(21) Appl. No.: 19/047,293

(22) Filed: Feb. 6, 2025

(65) Prior Publication Data

US 2025/0255276 A1      Aug. 14, 2025

Related U.S. Application Data

(60) Provisional application No. 63/551,717, filed on Feb. 9, 2024.

(51) Int. Cl.
A01K 15/02            (2006.01)

(52) U.S. Cl.
CPC .................................. A01K 15/026 (2013.01)

(58) Field of Classification Search
CPC .............. A01K 15/025; A01K 15/0252; A01K 15/0258; A01K 15/026; A01K 15/0257; A01K 15/0201
See application file for complete search history.

(56) References Cited

U.S. PATENT DOCUMENTS

| | | | | |
|---|---|---|---|---|
| 2,610,851 | A * | 9/1952 | Jones ..................... | A63H 33/00 |
| | | | | 119/710 |
| 6,546,896 | B1 * | 4/2003 | Markham ............ | A01K 15/026 |
| | | | | 119/710 |
| 10,772,298 | B1 * | 9/2020 | Mullin ................. | A01K 15/025 |
| 12,402,602 | B1 * | 9/2025 | Stone ................... | A01K 15/026 |
| 2005/0039696 | A1 | 2/2005 | Springer | |
| 2009/0025649 | A1 | 1/2009 | Gamble | |
| 2009/0151643 | A1 * | 6/2009 | Hodgins ............. | A01K 5/0114 |
| | | | | 119/51.01 |
| 2017/0020109 | A1 * | 1/2017 | Dewey ..................... | F16B 7/20 |
| 2018/0303061 | A1 | 10/2018 | Gennusa | |
| 2019/0141954 | A1 * | 5/2019 | Yuan .................... | A01K 15/025 |
| | | | | 119/707 |
| 2020/0113152 | A1 * | 4/2020 | Mcfarlane ............ | A01K 15/026 |
| 2020/0154676 | A1 * | 5/2020 | Walt ...................... | A01K 5/0114 |
| 2021/0153995 | A1 * | 5/2021 | Coopersmith ....... | A61K 8/0233 |
| 2021/0212290 | A1 * | 7/2021 | Stern .................... | A01K 15/026 |

(Continued)

OTHER PUBLICATIONS

International Search Report and Written Opinion in PCT Application No. PCT/US2025/014829, mailed May 27, 2025 (17 pages).

*Primary Examiner* — William L Gmoser
(74) *Attorney, Agent, or Firm* — Leason Ellis LLP

(57)            ABSTRACT

A chew toy according to one embodiment includes a first part having an elongated threaded post and a second part having a threaded bore that receives the threaded post. The second part has a transverse opening formed therein that is in communication with the threaded bore and is configured to receive an object that can be held therein by a force applied by the threaded post. The first part and the second part rotate relative to one another and have a range of axial movement relative to one another, but the threaded post is inseparably coupled to and contained within the threaded bore.

31 Claims, 18 Drawing Sheets

(56)    References Cited

U.S. PATENT DOCUMENTS

| 2022/0256808 A1* | 8/2022 | Axelrod | A01K 15/026 |
| 2023/0148566 A1 | 5/2023 | Ubel et al. | |
| 2023/0232787 A1 | 7/2023 | Karras | |
| 2024/0147964 A1* | 5/2024 | Tanoury | A01K 5/0114 |
| 2025/0031669 A1* | 1/2025 | Coopersmith | A01K 13/00 |

* cited by examiner

100

300

100

200

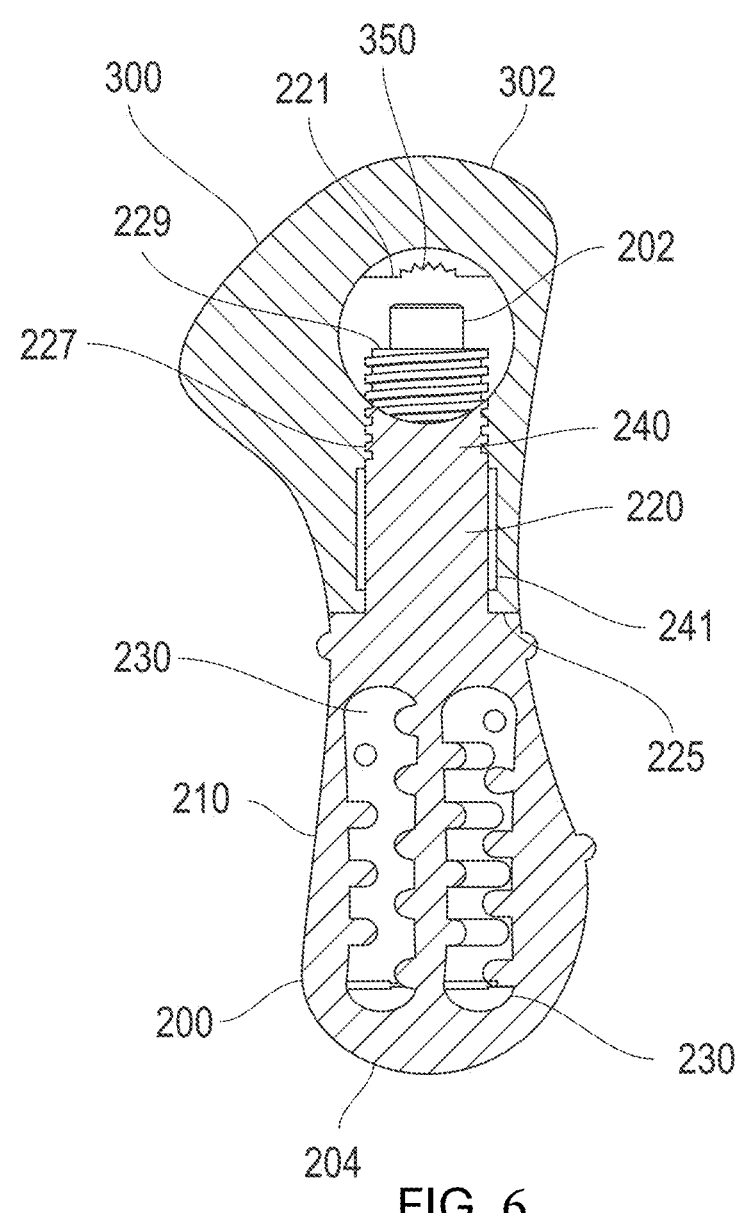
FIG. 6

603

603

632

503

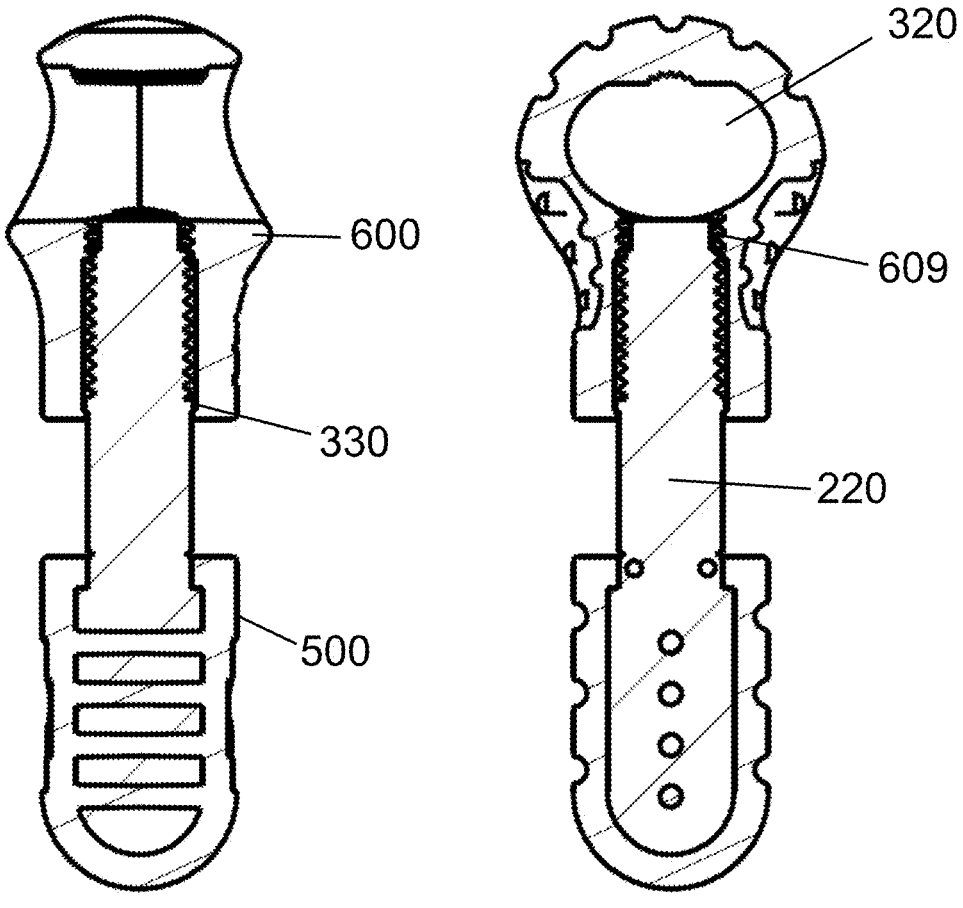
FIG. 18                    FIG. 19

CHEW TOY

CROSS REFERENCE TO RELATED APPLICATION

The present application claims priority to and the benefit of U.S. provisional patent application Ser. No. 63/551,717, filed Feb. 9, 2024, which is hereby expressly incorporated by reference in its entirety.

TECHNICAL FIELD

The disclosure relates to pet toys, specifically to a dog toy designed for the many play styles dogs engage in that is specifically configured to be a chew toy and to safely hold edible treats and sticks that can be consumed by the dog.

BACKGROUND

Dogs have a natural need for play regardless of age, size or breed. Dog toys are designed to support these activities, from carry and comfort, to fetch, tug and chew. Size, shape, material and in some instances scent or infused ingredients are all elements that are combined in the creation of a dog toy. The materials—such as rope, rubber, thermo-plastic rubber, leather, synthetic nylons, all types of woven, non-woven and knitted fabric—shape and structural design of the toy are combined to support a specific play activity or some combination of play activities. Some dog toys have scented ingredients to stimulate the olfactory sense of the dog to encourage interest and play engagement. A plurality of elements are often combined so the toy can satisfy instinctual needs, provide enhanced play experiences or provide opportunities for engagement by accommodating edible treats of various degrees of hardness, from solids to pastes or liquids that can be frozen into the toy. While it varies based on material types and design, durability is a consideration in the design, function and marketing of every dog toy.

Dogs of all ages, breeds and sizes have a natural instinct and need to chew. Chew toys are designed to support this activity so the chewing need can be more safely satisfied in almost any indoor or outdoor environment. A well-designed chew toy will engage the dog, stimulate them to fulfill their instinctive needs, and reduce the likelihood of their chewing on furniture, clothing or other articles that are not intended for chewing by dogs. By definition, regardless of the dog's chewing power, a chew toy must be made from suitably durable materials and provide shapes that allow the dog to chew safely.

That said, dogs have different jaw sizes, bite strength and styles or preferences for how they want to chew. This has inspired the use of specific materials and influenced the design of shapes that best satisfy this wide range of dog chewing preferences. To better attract and engage dogs to want to chew the toy, materials are infused with scents and/or flavors, or where structurally safe, features are embedded to emit noise, or provide some textural response that stimulates. There are also categories or types of chew toys that can incorporate edible treats of various forms to attract and satisfy a dog's needs. Finally, there is a category of chew toys made from vegetable or animal materials that can be molded into a fully consumable chew toy.

Treat dispensing toys are especially popular as their design typically optimizes a play capability along with the ability to maximize engagement as the dog must figure out through play how to "win" the treat. These types of toys typically do not have any mechanism to secure a treat as their purpose is to dispense treats.

SUMMARY

A chew toy according to one embodiment includes a first part having an elongated threaded post and a second part having a threaded bore that receives the threaded post. The second part has a transverse opening formed therein that is in communication with the threaded bore and is configured to receive an object that can be held therein by a force applied by the threaded post. The first part and the second part rotate relative to one another and have a range of axial movement relative to one another, but the threaded post is inseparably coupled to and contained within the threaded bore.

The threaded post includes a retaining lip that extends radially outward from the post and an interior wall of the threaded bore has an inner retaining flange. The retaining lip is captured between the inner retaining flange and a closed end of the threaded bore, thereby preventing separation of the first part and the second part. The first and second parts move between a fully retracted position in which the first and second parts are not separated and a fully extended position in which the first and second parts are separated a maximum distance. In the fully retracted position, the retaining lip is spaced from the inner retaining flange, while in the fully extended position, the retaining lip is in contact with inner retaining flange.

In another embodiment, a chew toy includes a first part having a first end portion; and a second part having a second end portion. The first part and the second part are shaped such that when one of the first end portion and the second end portion lies stable on a ground surface, the other of the first end portion and the second end portion is upright at an angle to the ground surface, whereby application of a downward force to one of the first end portion and the second end portion causes a lifting of the other of the first end portion and the second end portion. This construction provides a rocking motion to the chew toy that advantageously allows the dog to change the angle of attack on the edible being held by the chew toy but the design does not allow for uncontrolled rolling of the toy.

BRIEF DESCRIPTION OF THE DRAWING FIGURES

FIGS. 1-6 illustrate a chew toy according to one embodiment and being shown in a fully retracted position:

FIGS. 16-19 illustrate the chew toy in a fully extended position:

DETAILED DESCRIPTION OF CERTAIN EMBODIMENTS

Figure 1:
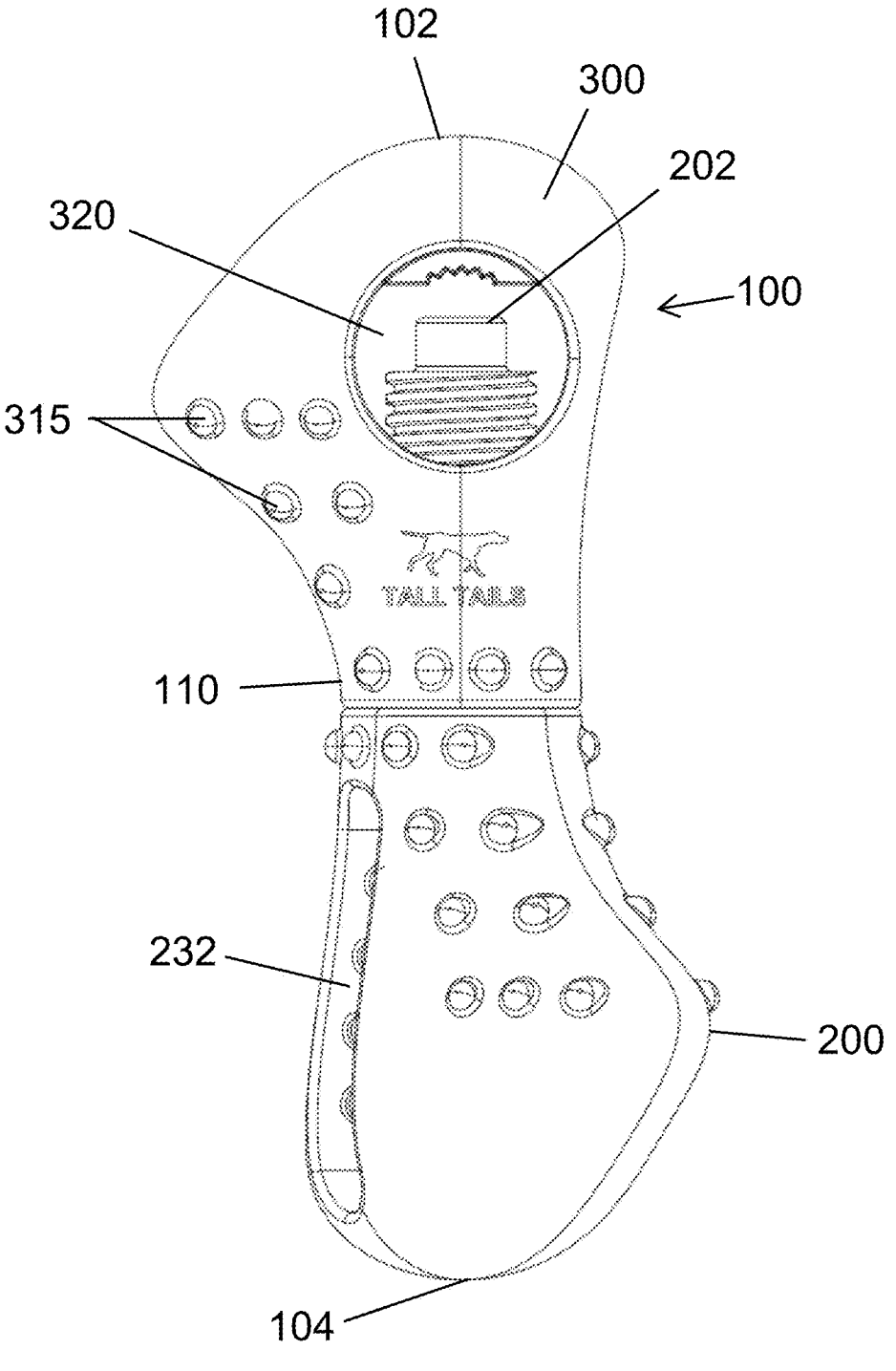
Figure 2:
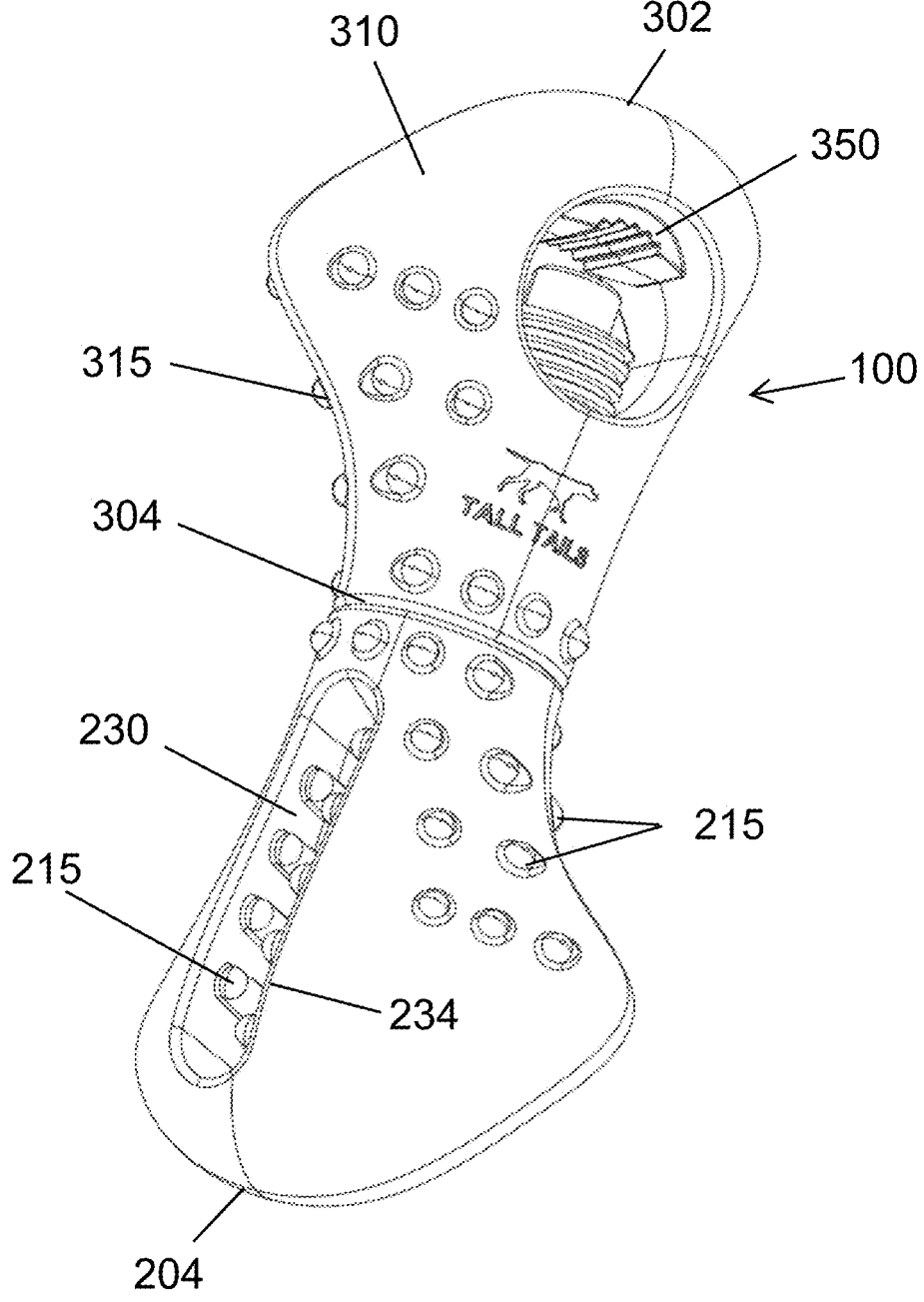
Figure 3:
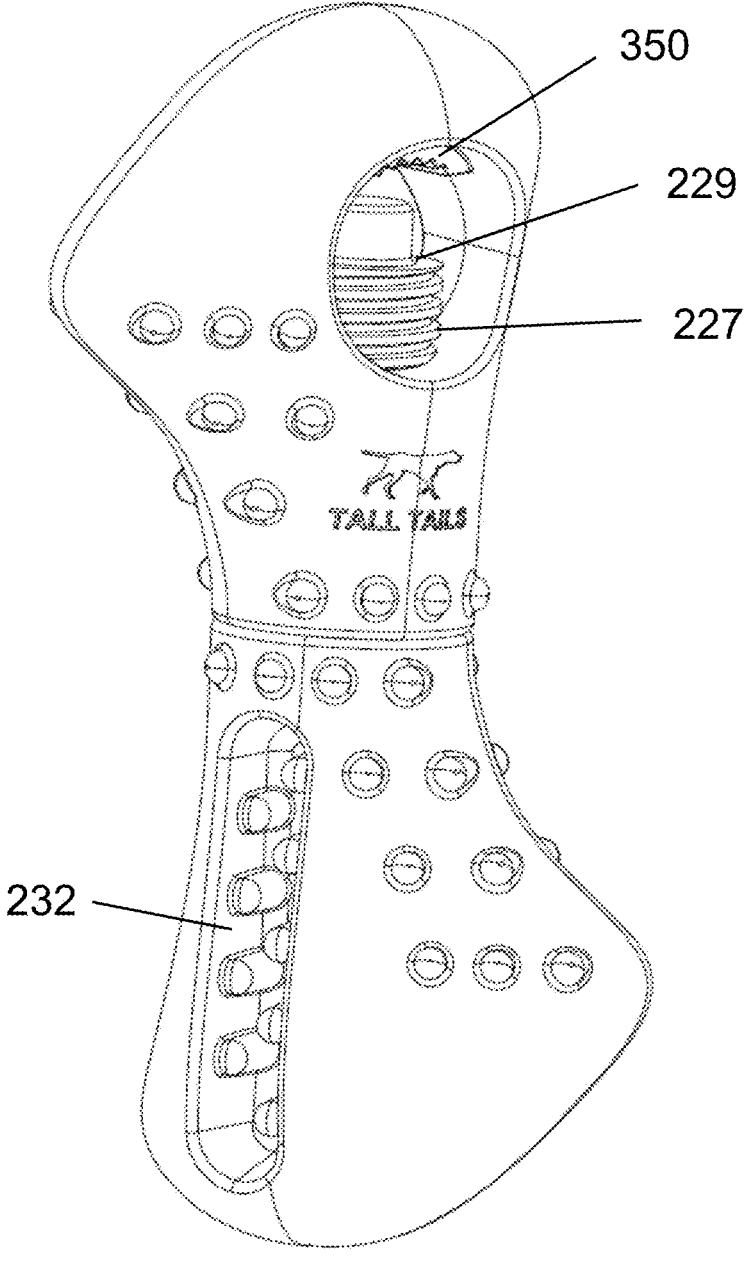
Figure 4:
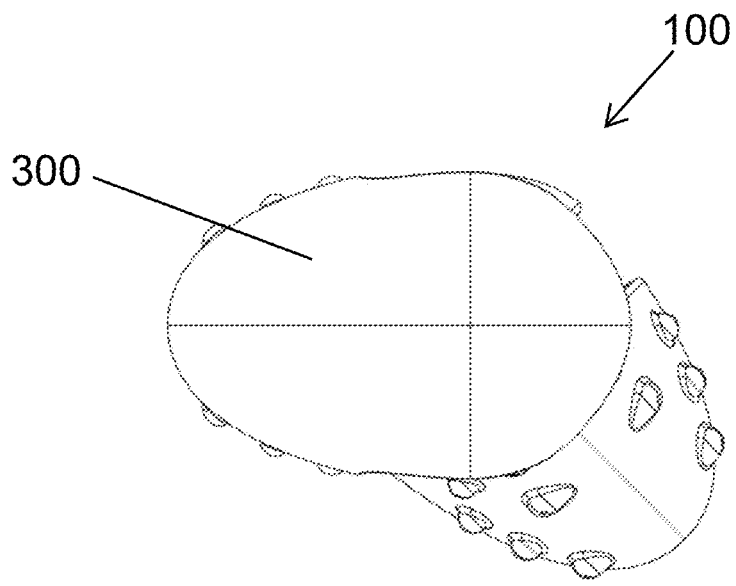
Figure 5:
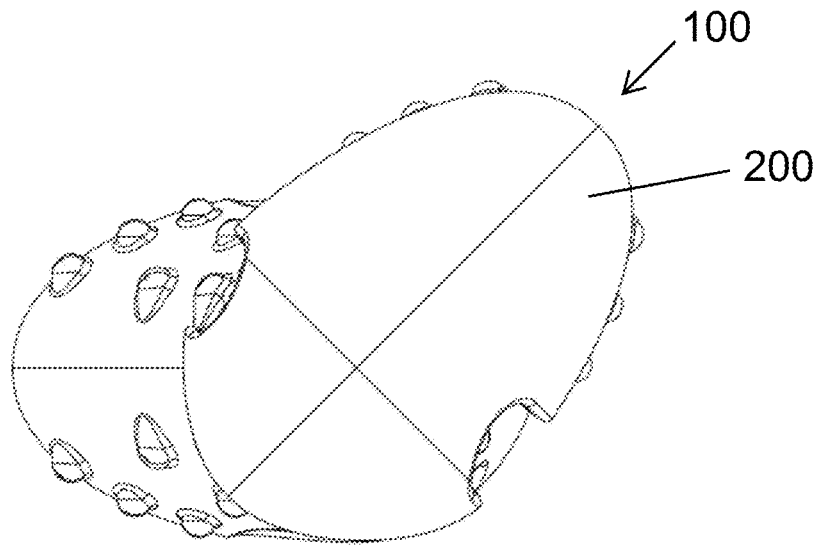

FIGS. 1-10 illustrate a dog chew toy 100 in accordance with one embodiment of the present disclosure. The dog chew toy 100 combines the desirable attributes of both a chew dog toy and a treat-dispensing dog toy. More specifically, the chew toy 100 is constructed so that it can be safely chewed on by the dog and moreover, the chew toy 100 is configured and designed to hold a treat and in this way, functions as a treat-dispensing toy. The physical structure of the chew toy 100 is described herein first and then the materials and functionality of the chew toy 100 are described. It will be understood that the object that can be held within the chew toy 100 can take many different forms and can include a stick, treat, or a firm vegetable, such as a carrot, or celery stick, etc. Thus, the word "treat" that is used herein is intended to cover any suitable object that can be held within and by the chew toy 100 to provide enjoyment to the dog.

The chew toy 100 comprises an elongated body 110 that is defined by a first end 102 and an opposing second end 104. As described here in more detail, the elongated body 110 is actually formed of a first part 200 and a second part 300 that is coupled to the first part 200 in such a way that during normal use of the chew toy 100, the first and second parts 200, 3X) are not separable. In other words, the first and second parts 200, 300 are coupled so that they cannot be detached from one another during normal use; however, there is a range of motion between the first and second parts 200, 300 as described herein. More specifically, as described herein, the first and second parts 200, 300 can rotate relative to one another and there is also a range of axial movement between the two parts.

The chew toy 100 and in particular, the first and second parts 200, 300, thereof can be formed to have different shapes including the one illustrated and described herein (e.g., bone shaped).

First Part 200

The first part 200 is an elongated part that has a first end 202 and an opposing second end 204, with the second end 204 being the same as the second end 104. The first part 200 is preferably formed as a single body (e.g., molded structure) and has a main end portion 210 and an elongated post or shaft (screw plunger) 220 that extends outwardly from the main end portion 210. The main end portion 210 functions as a chew part and can include tactile features which are described in more detail hereinbelow. The first part 200 can be considered to be a male part and in particular, the post 220 acts as a male component of a treat-holding mechanism that is described herein. The dimensions of the post 220 are less than the dimensions of the main end portion 210 and more particularly, the width of the post 220 is less than the width of the main end portion 210. This results in a shoulder 225 being formed between the post 220 and the main end portion 210. The shoulder 225 can be a right-angle shoulder as shown. The post 220 has a distal end 221 which comprises the first end 202 and the distal end 221 can be a smooth, flat surface or can be a contoured surface that has tactile features to improve gripping and holding of the treat. For example, the distal end 221 can therefore be flat, concave with parallel ridges or convex with parallel ridges to optimize holding power when tightened.

The main end portion 210 can include at least one tactile feature and can include a plurality of different tactile features formed as part thereof. In the illustrated embodiment, the main end portion 210 can include a plurality of raised protrusions 215 that can be in the form of (rounded) bumps that are formed and arranged along the outer surface of the main end portion 210. The raised protrusions 215 can be formed in one or more areas (patches). For example, there can be a ring of spaced apart raised protrusions 215 proximate the shoulder 225. The main end portion 210 can include one or more recessed areas (channels) 230 for additional treat holding capability and/or holding spreads. Each recessed area 230 can be in the form of an elongated trough. The recessed area 230 itself includes raised protrusions (ribs or dentures) 215. As shown, each recessed area 230 is defined by a first side wall 232 and a second side wall 234 located parallel to and across from the first side wall 232. One row of raised protrusions 215 can be formed along or proximate to the first side wall 232 and another row of raised protrusions 215 can be formed along or proximate to the second side wall 234. The raised protrusions 215 formed along the first and second side walls 232, 234 are offset from one another in that they are not formed directly opposite one another. This orientation of the raised protrusions 215 within the recessed area 230 provides an area that can hold an object, such as a treat or the like. For example, a treat can be placed into the trough and retained between and by the raised protrusions 215 on the opposite side walls.

The ratio of the depth and length of the recessed area 230 is selected to accommodate treats or spreads. In addition, the recessed area (channel) 230 can include dentures that are contiguous to the molded form that establish surface areas that support dental health when chewing.

The illustrated embodiment includes two recessed areas on opposite sides of the main end portion 210. It will also be appreciated that the raised protrusions 215 can be formed to have different sizes and/or different shapes. As shown, the raised protrusions 215 are limited to being formed along the main end portion 210 and not the post 220. It will be understood that the recessed areas are optional.

As mentioned, the post 220 is an elongated structure (e.g., cylindrical shaped) and can have a stepped construction in that the first end 202 can have a step as a result of the post 220 having reduced dimensions compared to the other length of the post 220. This stepped construction can be defined by another shoulder 229 which can be a right-angle shoulder.

The post 220 can have a threaded portion that is defined by outer threads 227. The outer threads 227 extend to the shoulder 229. The post 220 also has a retaining lip or flange 240 that extends radially outward from the post 220. The retaining lip 240 is located adjacent to the proximal end of the outer threads 227 in that the outer threads 227 are located between the retaining lip 240 and the shoulder 229. The retaining lip 240 extends radially outward relative to the outer threads 227. The retaining lip 240 can be in the form of a continuous ring (as illustrated) or can be formed of multiple arcuate shaped segments that extend circumferentially around the post 220. Another portion 241 of the post 220 can be devoid of the outer threads 227. This portion 241 extends from the shoulder 225 to the retaining lip 240.

Second Part 300

The second part 300 is an elongated hollow part that has a first end 302 and an opposing second end 304, with the first end 302 being the same as the first end 102. The second part 300 has a main end portion 310 and an elongated stem-like portion that extends outwardly from the main end portion 310. The main end portion 310 functions as a chew part and can include tactile features which are described in more detail hereinbelow. The second part 30) can be considered to be a female part of the treat-dispensing mechanism.

More specifically, the second part 300 is a hollow part in that it includes a first opening or first bore 301 at the second end 304. The first bore 301 is elongated in nature and extends longitudinally within the second part 300. The first bore 301 can have a cylindrical shape. The first bore 301 can be defined by different sections and more particularly, can be defined by a first section 303 and a second section 305. The first bore 301 is open at the second end 304 and the second section 305 is adjacent to this opening of the first bore 301 at the second end 304. The first section 303 can comprise a threaded section defined by inner threads 309. The inner threads 309 are integrally formed in the second part 300. The inner threads 309 are complementary to the outer threads 227 of the post 220 to allow the post 220 to threadingly mate with the second part 300. In other words, the post 220 can be screwed onto the second part 300 as described herein.

As shown, the first section 303 has dimensions that are less than dimensions of the second section 305 and more particularly, the first section 303 has dimensions that are less than the second section 305. As shown, the second section 305 lacks any threads and can have an unadorned, smooth surface.

The second section 305 has an inner retaining flange 330 that is formed at the second end 304. In other words, the inner retaining flange 330 is formed at the opening of the first bore 301. The inner retaining flange 330 can be in the form of an annular shaped protrusion that extends continuously around the inner wall that defines the first bore 301. The inner retaining flange 330 can be continuous and uninterrupted in shape; however, it can also comprise a segmented structure that is formed of two or more arcuate shaped structures that define a segmented ring.

The inner retaining flange 330 and the retaining lip 240 are formed in view of one another in that the inner retaining flange 330 acts as a stop and limits and restricts movement of the post 220 in one direction. The inner retaining flange 330 thus defines one end of travel of the post 220 and thus, defines maximum separation of the two main end portions of the first and second parts 200, 300. More specifically, the retaining lip 240 is unable to clear the inner retaining flange 330 and thus, the first and second parts 200, 300 are inseparably coupled to one another. Once coupled together, in the manner described herein, the first and second parts 200, 300 cannot be separated from one another since the retaining lip 240 contacts the inner retaining flange 330 and cannot move past the inner retaining flange 330 in a direction that would separate the two parts 200, 300.

The second part 300 also includes a transverse opening 320 that is a through hole that extends transversely through the main end portion 310 in that the transverse opening 320 is open along the first and second side faces of the main end portion 310. In the illustrated embodiment, the transverse opening 320 has a circular shape; however, the transverse opening 320 can have other shapes. As described herein, the transverse opening 320 is designed to hold a treat and since it is a through hole, the ends of the treat can protrude outwardly from the two opposing sides (faces) of the main end portion 310.

In addition, the interior wall of the transverse opening 320 can have a grip feature or holder 350 that assists in holding the treat within the transverse opening 320. The transverse opening 320 can be considered to have a first end that is closest to the first end 102 of the chew toy and a second end that is closest to the stem of the second part 300. The grip feature 350 is located along the first end of the transverse opening 320 and can be in the form of a structure that can contact and/or grip the treat. For example, the grip feature

350 can comprise a knurled surface or can comprise a series of teeth and/or pointed protrusions. The illustrated grip feature 350 comprises a flat formed within a center concave section that has a series of teeth or the like. The grip feature 350 is directly opposite the distal end (first end) of the post 220 and therefore, as described herein, when a treat is positioned within the transverse opening 320, the treat is positioned and held between the post 220 and the grip feature 350. The grip feature 350 can thus be in the form of a raised surface within the transverse opening 320 with parallel ridges to provide friction for holding the treat or stick as the post 220 (screw plunger) applies pressure.

The first bore 301 is also in communication with the transverse opening 320 in that the first bore 301 intersects and forms an entrance into the transverse opening 320. The first section 303 is thus immediately adjacent to the transverse opening 320. This orientation, as described herein, allows for the post 220 to be driven at least partially into the transverse opening 320.

The main end portion 310 can include at least one tactile feature and can include a plurality of different tactile features formed as part thereof. In the illustrated embodiment, the main end portion 310 can include a plurality of raised protrusions 315 that can be in the form of (rounded) bumps that are formed and arranged along the outer surface of the main end portion 310. The raised protrusions 315 can be formed in one or more areas (patches). For example, there can be a ring of spaced apart raised protrusions 315 proximate the end of the second part 300. The main end portion 310 can include select patches of raised protrusions 315.

The raised protrusions 215, 315 provide textured surfaces to provide stimulation to the dog's tongue and mouth.

Initial Coupling of the First and Second Parts 200, 300

To initially couple the first and second parts 200, 300, the post 220 is received within the female portion (first bore 301) of the second part 300 and the first and second parts 200, 300 are joined together. This initial coupling can be performed at the point of manufacturing. The end user thus does not perform this operation and instead is supplied the product in its coupled state (and is inseparable in normal use). In one embodiment, the first and second parts 200, 300 can be joined as whole parts or alternatively, the first and second parts 200, 300 can be joined with one of the parts 200, 300 being itself in multiple parts that are later joined together. For example, the second part 300 can initially be formed as two parts (e.g., two halves) and the first part 200 is inserted between these two halves, which are then subsequently joined together (e.g., as by bonding (adhesive, heat seal, sonic welding etc.).

As mentioned, the chew toy 100 is intended to be supplied in its coupled state and during normal use, the two parts 200, 300 cannot be separated (uncoupled). This provides safety advantages over conventional toys in that the toy 100 remains as one and does not break down into smaller parts and also it provides convenience to the user in that by remaining intact, the parts 200, 300 cannot be separated and lost.

Retracted and Extended Positions of Chew Toy 100

As described herein, the first and second parts 200, 300 move between a first position which can be considered to be a fully tightened (retracted) position in which the first and second parts 200, 300 have minimum separation and a second position which can be considered to be a fully extended position in which the first and second parts 200, 300 have maximum separation.

FIGS. 1-6 illustrate the retracted position of the chew toy 100. In this position, the post 220 is threadingly attached to the second part 300 in that the outer threads 227 of the post 220 are threadingly engaged with the inner threads 309. In the fully retracted position, the shoulder 225 seats against the second end 304 of the second part 300 and the distal end 221 of the post 220 is received within the transverse opening 320 (e.g., the post 220 occupies a substantial area of the transverse opening 320 (e.g., 50% or more in one embodiment)). In this fully retracted position, there is a space between the distal end 221 of the post 220 and the grip feature 350. This space is at a minimum distance in the fully retracted position. In order to fit a larger sized treat within the space, the post 220 is backed off from the grip feature 350 by unscrewing the first part 200 from the second part 300, resulting in the post 220 moving away from the grip feature 350. Much like a vise, the user can initially open up the treat dispensing mechanism by unscrewing the post 220 to create more clearance to initially receive the treat before then tightening the post 220 against the treat.

As shown, in the fully retracted position, the retaining lip 240 is spaced from and is not in contact with the inner retaining flange 330. However, the retaining lip 240 does not enter the first section 303 and does not contact or engage the inner threads 309. Instead, only the outer threads 227 are engaged with the inner threads 309.

Figure 7:
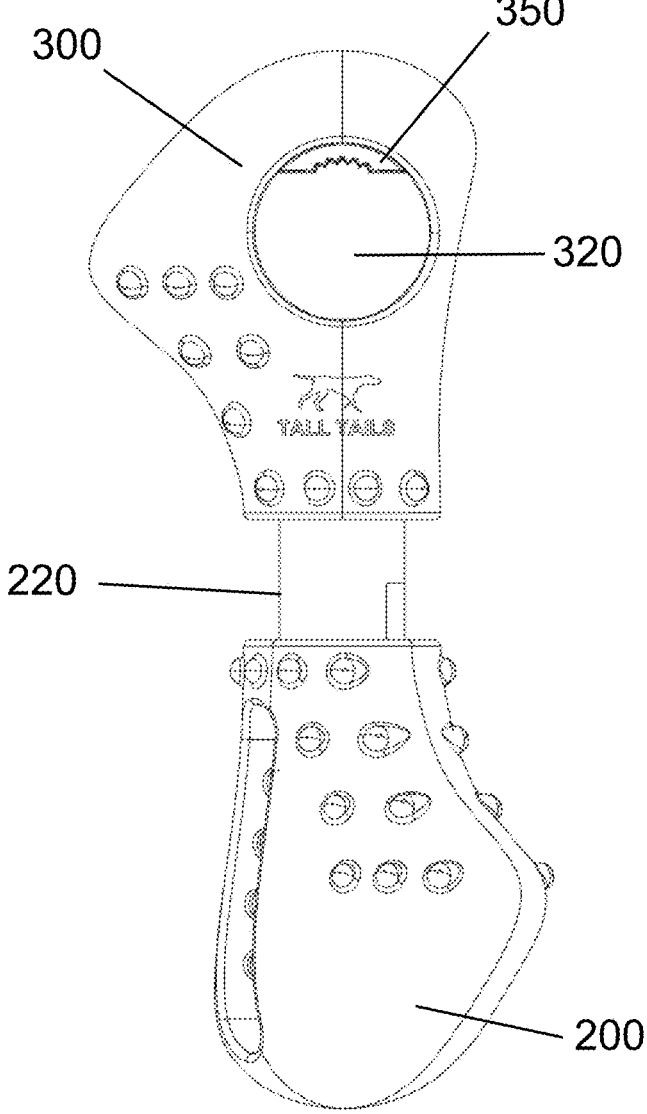
FIGS. 7-8 illustrate the chew toy in a fully extended position.
Figure 8:
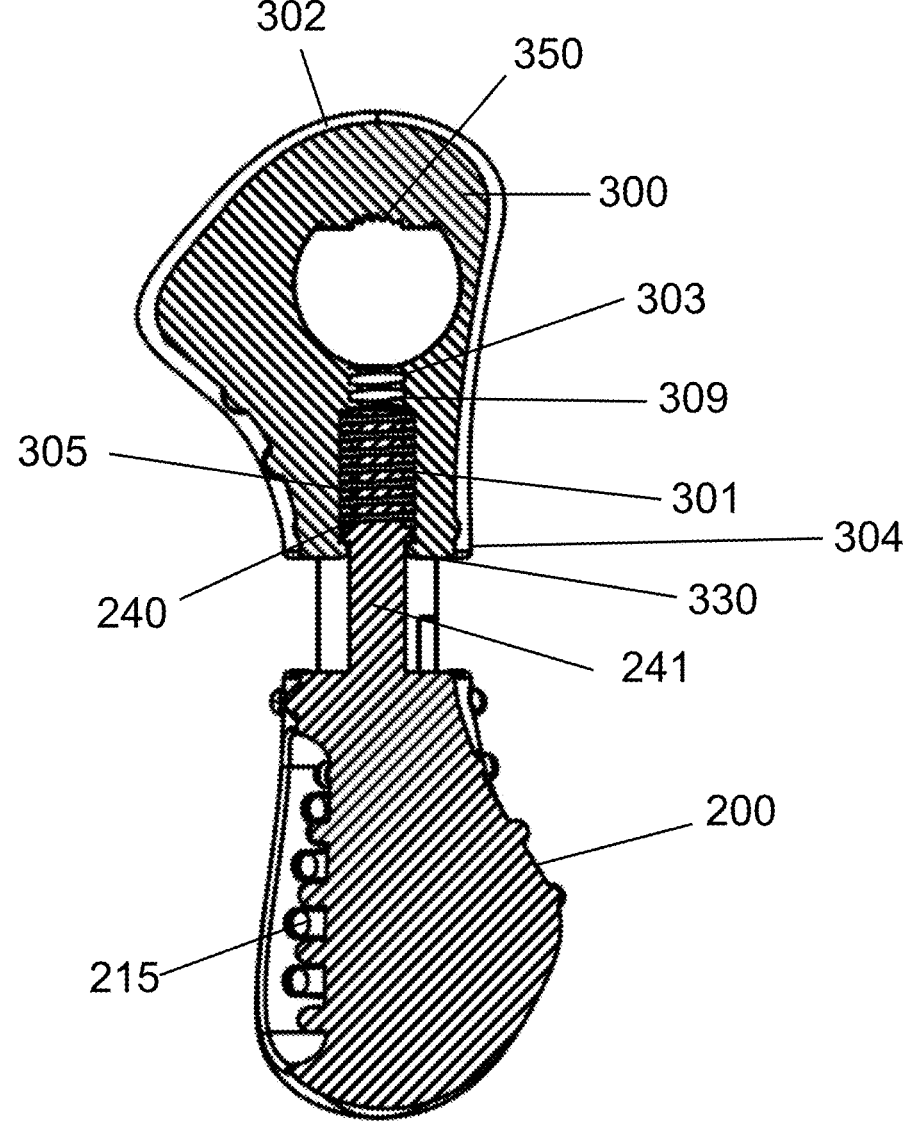

The fully extended position is shown in FIGS. 7-8. In this position, the distal end 221 of the post 220 can be completely withdrawn from the transverse opening 320 in that it is not located within the transverse opening 230. The transverse opening 230 in this position is at a maximum in terms of open space to receive a treat. In other words, without the post 220 in the transverse opening 320, the treat of various size can be received within the transverse opening 230. However, the retaining lip 240 prevents the first part 220 from being separated from the second part 30) even when the post 220 is completely unscrewed from the second part 300. This is because the retaining lip 240 cannot clear the inner retaining flange 330 and thus the inner retaining flange 330 acts as a stop that prevents separation of the first part 200 from the second part 300. This is in contrast to conventional chew holding toys in which the two parts 200, 300 fully separate by completely unscrewing one part from the other part.

To retain and hold the treat within the transverse opening 320, the first and second parts 200, 300 are manipulated by unscrewing the first part 200 relative to the second part 300, thereby creating enough open space within the transverse opening 320 to receive the treat. The treat can be positioned within the center of the transverse opening 320 adjacent to the grip feature 350 and aligned within the distal end 221 of the post 220. To hold the treat, the user screws the first part 200 relative to the second part 300 causing the post 220 to move axially in a direction toward the grip feature 350. As the post 220 moves in this direction, the distance between the distal end 221 and the grip feature 350 decreases and the distal end 221 of the post 220 is driven into contact with the treat. As the post 220 is driven, the post 220 applies a force against the treat resulting in the treat being held between the grip feature 350 and the post 220. The first and second parts 200, 300 are tightened until the treat is securely held between the grip feature 350 (a wall) and the post 220. The teeth of the grip feature 350 bite into the treat to assist in holding the treat.

The length of the second section 305 is specifically selected and designed such that when the first and second parts 200, 300 are separated at a maximum distance (fully extended position), the outer threads 227 of post 220 are entirely or at least substantially located within the second section 305 as opposed to being threadingly engaged with the inner threads 309. However, in this fully extended position, the retaining lip 240 is in contact with the inner retaining flange 330.

It will also be appreciated that the screwing movement can be activated by rotating either the first part 200 or the second part 300.

Materials

As mentioned, the chew toy 100 functions not only as a treat-holding toy but also functions as a chew toy. As such, the chew toy 100 is formed of a material that is suitable and safe for a dog to gnaw on and chew on with or without a treat or stick inserted into the transverse opening 320.

In one embodiment, the chew toy 100 is made from animal, vegetable or cellulose material that is processed with organic or petroleum-based materials that support transformation through injection molding to form a safe to chew durable material for the chew toy 100. In one embodiment, the chew toy 100 is formed of a material that has a shore hardness of between 40 to 100. The materials are food-grade safe, dishwasher safe and freezer safe. In one embodiment the chew toy 100 is formed only of animal or vegetable material that is entirely consumable. Alternatively, the chew toy 100 can be formed from a rubber composition.

Shape of Chew Toy 100

As shown, the chew toy 100 has an ergonomic shape and in particular, has an ergonomic grip for easy tightening. Therefore, a maximum holding force can be achieved more easily due to the user easily gripping and rotating the parts 200, 300. The chew toy 100 has an ergonomic symmetrical shape that has an oblong extension to optimize grip to move easily apply force to tighten or loosen the screw mechanism holding the treat or stick.

The illustrated chew toy 100 has a symmetrical shape; however, when the screw (post 220) is fully tightened without a treat inserted for use as a chew toy, the two ends 102, 104 of the chew toy 100 are offset, providing motion when the dog interacts with the chew toy 100. In particular, when one of the first part 200, 300 lies flat on the ground, the other part 200, 300 is in a raised position. For example, the other part can be at an angle of 90 degrees or less than 90 degrees relative to the ground surface. The shape of the chew toy 100 is stable in this position in that it can sit on a flat surface without rolling. However, since one part 200, 300 is raised relative to the other part 200, 300 when the one part 200, 300 lies flat on the ground, this orientation permits a rocking and rolling action when the dog plays with the chew toy 100 and pushes it. In other words, while the chew toy 100 can have a symmetric shape, it assumes a range of asymmetrical shapes and an asymmetrical shape when the post 220 is completely screwed into a closed position (i.e., the fully retracted position of the chew toy 100) in a non-linear position so the shape naturally rocks when touched and the extension of the symmetrical piece provides surface area for being held in place to the ground allowing support for chewing and or licking of the device or a spread on the device, and the variability of the positioning of the chew toy 100 by the force of the dog's paw positions the treat/stick inserted into the chew channel (the transverse opening) or being held in the diameter of the chew toy 100 in a manner that improves the accessibility of the treat/stick to the dogs molars.

In one embodiment, when the part 300 lies stable on the ground, the part 200 is at an angle of less than 90 degrees relative to the ground. In this orientation, the edible is at an angle. The angle of the first part 200 in this orientation can be selected such that when the part 200 transitions from the upright angled position to a position at which it lies stable on the ground surface, the angle of the edible changes. In one embodiment, the degree at which the edible changes is less than 60 degrees. However, it will be appreciated that this angle of change of the edible can be less or more than 60 degrees (e.g., it can be 45 degrees or less, etc.).

As mentioned and with reference to FIGS. 20A-20F, one aspect of the present chew toy 100 is that it is constructed to act as a positioning aid with stability control. More specifically, in the chew toy 100, the purposeful angularly offsetting of the two ends of the chew toy 100 allows for a rocking motion but does not let the chew toy 100 freely rotate or move in an uncontrolled manner to facilitate the treat being in a position to best support access for the dog to chew effectively on the treat. In other words and as previously described, the chew toy 100 is constructed so that when one end lies substantially planar to the ground, the other end is at angle; and conversely, when the other end is substantially planar to the ground, the one end is at angle. This construction provides stability but also provides a rocking motion in that when the angled end is pushed down and assumes the substantially planar position, the other end moves from being substantially planar to being angled. The ends of the chew toy 100 are thus designed so that at least in one position, the end is stable and rests on the ground and resists free movement.

In the illustrated embodiment, each of the ends of the chew toy 100 includes a lateral protruding (pointed) portion that acts as a stop. If the chew toy 100 is pushed toward the ground by applying force to the top of the protruding portion of the end that is in a stable position to the ground, the protruding portion seats against the ground and resists further movement (i.e., prevents rotation). Conversely, if a force is applied to the protruding portion of the end that is angled and upstanding relative to the ground, this causes that end to move from the angled upstanding position to the stable position (and also causes the opposite end to move in the opposite way from stable to angled upstanding).

This rocking motion allows for the dog to change the angle of attack with respect to the edible that is held in the chew toy 100. As shown in FIGS. 20A-20F, the edible protrudes upwardly from the chew toy 100 and the rocking motion shifts the angle of attack of the dog. By adjusting the angle of attack, the dog can more easily and comfortably position the edible at the molars which are the teeth used for grinding and chewing.

The purposeful offsetting of the ends of the chew toy 100 acts as a positioning aid but the construction also provides stability that prevents uncontrolled and unwanted motion, such as free rolling, that would frustrate the dog since the edible would be shifting in space as the dog is chewing. Instead, a controlled rocking motion offers an improved solution to optimize the dog's point of attack.

Figures 20A, 20B, 20C, 20D, 20E, 20F:
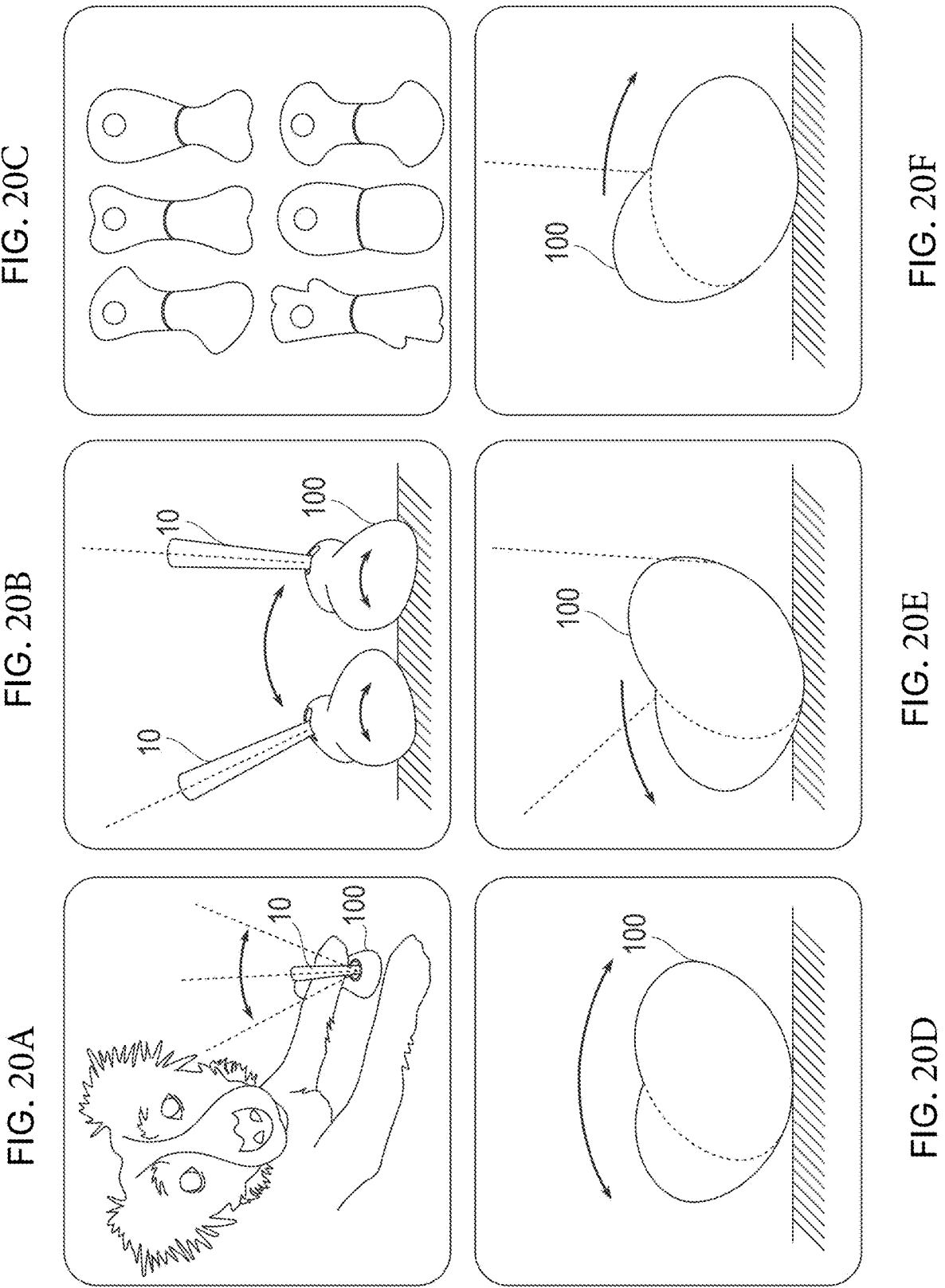
FIGS. 20A-20F illustrate the rocking motion of the chew toy that allows the dog to advantageously change the point of attack to more comfortable insert and chew the edible between the rear molars of the dog.

Alternative Shapes (FIG. 20C)

FIG. 20C shows different shaped two part chew toys 100. These alternative designs incorporate the inseparable coupling feature described herein with respect to the illustrated chew toy 100. In other words, the two parts include the retaining lip 240 and the inner retaining flange 330 that allow for the range of motions described herein but do not allow for separability during normal use of the product.

In addition, the end of the second part 300 can include a flat (planar section) that facilitates the chew toy 100 being stably positioned in a vertical orientation in which the dog can grasp and chew on the edible.

Figure 21:
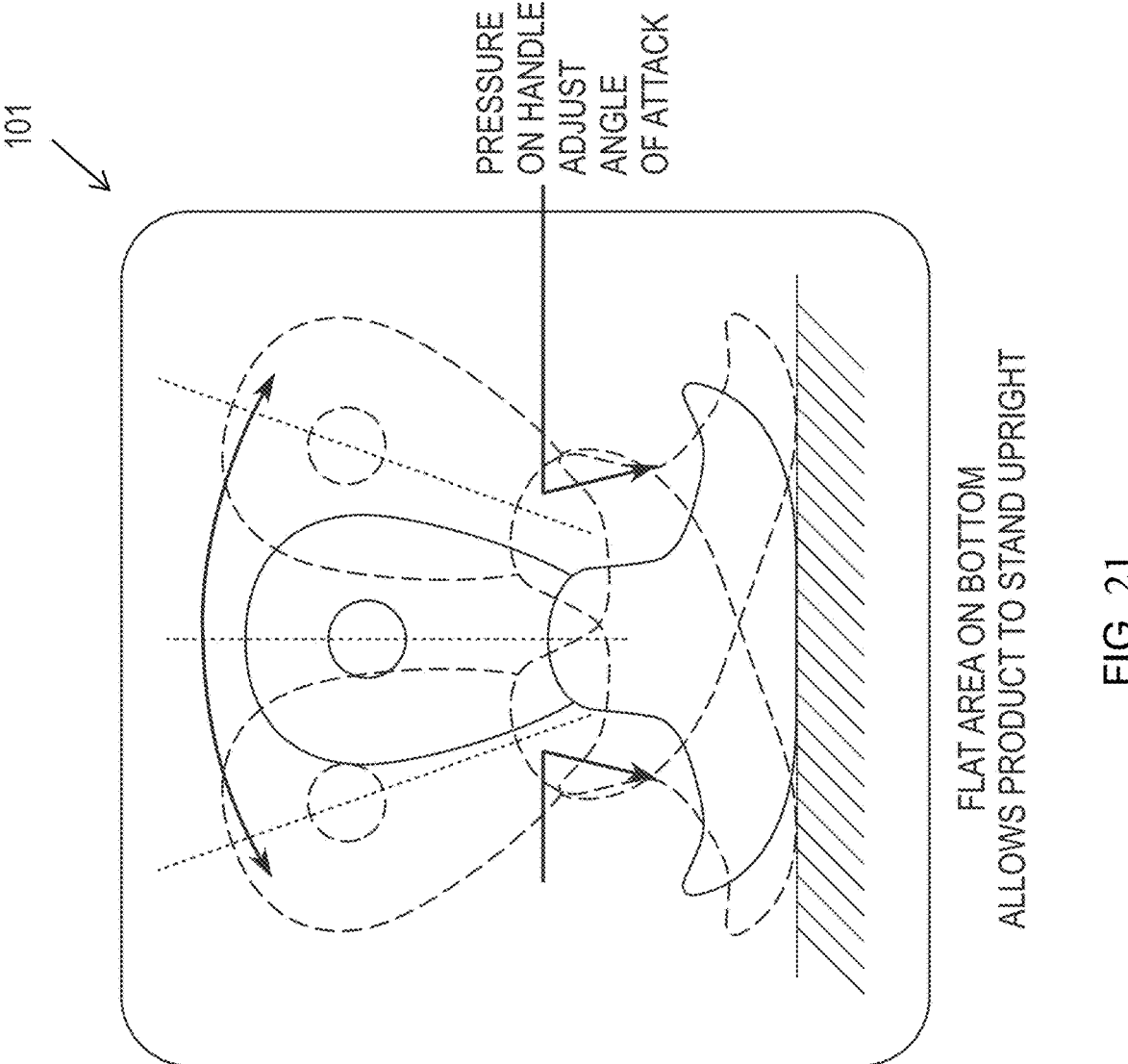
FIG. 21 is a side view of an alternative chew toy showing its rocking motion.

Now referring to FIG. 21 in which another embodiment is shown and indicated at 101. Like the alternative shapes of FIG. 20C, the embodiment in FIG. 21 is of a two-part construction that can include the retaining lip 240 (FIG. 9) and the inner retaining flange 330 that allow for the range of motions described herein but do not allow for separability during normal use of the product. In this embodiment, the first part that functions like first part 200 has a rocking horse shape in that it can have a generally flat center portion with two raised ends that can be considered to be two handles. Like a rocking horse, when one end is pushed down, that end comes into contact with the ground and the other end raises.

The flat area on the bottom allows the chew toy to stand upright. Pressure on either of the two ends (handles) adjusts the angle of attack since the chew toy rocks. By providing stability when the chew toy is in the vertical orientation, the dog has another position of the chew toy in which the edible is engageable.

Chew Toy

FIGS. 11-19 illustrate a dog chew toy 400 in accordance with one embodiment of the present disclosure. The dog chew toy 400 combines the desirable attributes of both a chew dog toy and a treat-dispensing dog toy. More specifically, the chew toy 400 is constructed so that it can be safely chewed on by the dog and moreover, the chew toy 400 is configured and designed to hold a treat and in this way, functions as a treat-dispensing toy. The chew toy 400 has a similar construction and similar features as the chew toy 100 and therefore, like elements are numbered alike.

As with the chew toy 100, the chew toy 400 comprises an elongated body that is defined by a first end and an opposing second end. As described here in more detail, the elongated body is actually formed of a first part 500 and a second part 600 that is coupled to the first part 500 in such a way that during normal use of the chew toy 400, the first and second parts 500, 600 are not separable. In other words, the first and second parts 500, 600 are coupled so that they cannot be detached from one another during normal use; however, there is a range of motion between the first and second parts 500, 600 as described herein. More specifically, as described herein, the first and second parts 500, 600 can rotate relative to one another and there is also a range of axial movement between the two parts.

First Part 500

The first part 500 is an elongated part that has a first end and an opposing second end. The first part 500 is preferably formed as a single body (e.g., molded structure) and has a main end portion 510 and an elongated post or shaft (screw plunger) 220 that extends outwardly from the main end portion 510. The main end portion 510 functions as a chew part and can include tactile features which are described in more detail hereinbelow. The first part 500 can be considered to be a male part and in particular, the post 220 acts as a male component of a treat-holding mechanism that is described herein. The dimensions of the post 220 are less than the dimensions of the main end portion 510 and more particularly, the width of the post 220 is less than the width of the main end portion 510. This results in a shoulder being formed between the post 220 and the main end portion 510. The shoulder can be a right-angle shoulder as shown. The post 220 has a distal end 221 which comprises the first end of the first part 500 and the distal end 221 can be a smooth, flat surface or can be a contoured surface that has tactile features to improve gripping and holding of the treat. For example, the distal end 221 can therefore be flat, concave with parallel ridges or convex with parallel ridges to optimize holding power when tightened.

The main end portion 510 can include at least one tactile feature and can include a plurality of different tactile features formed as part thereof. In the illustrated embodiment, the main end portion 510 can include a plurality of recessed sections 503. In the illustrated embodiment, there are two sets of recessed sections 503 formed along the two sides of the first part 500 and in particular, the two sets are located 180 degrees apart from one another. Each recessed section 503 can be in the form of a groove or channel.

The first part 500 includes the post 220 which is an elongated structure (e.g., cylindrical shaped) and can have a stepped construction in that the first end and can have a step as a result of the post 220 having reduced dimensions compared to the other length of the post 220. This stepped construction can be defined by another shoulder which can be a right-angle shoulder.

The post 220 can have a threaded portion that is defined by outer threads 227. The outer threads 227 extend to the shoulder. The post 220 also has a retaining lip or flange 240 that extends radially outward from the post 220. The retaining lip 240 is located adjacent to the proximal end of the outer threads 227 in that the outer threads 227 are located between the retaining lip 240 and the shoulder. The retaining lip 240 extends radially outward relative to the outer threads 227. The retaining lip 240 can be in the form of a continuous ring (as illustrated) or can be formed of multiple arcuate shaped segments that extend circumferentially around the post 220. Another portion 241 of the post 220 can be devoid of the outer threads 227. This portion 241 extends from the shoulder 225 to the retaining lip 240.

Figure 9:
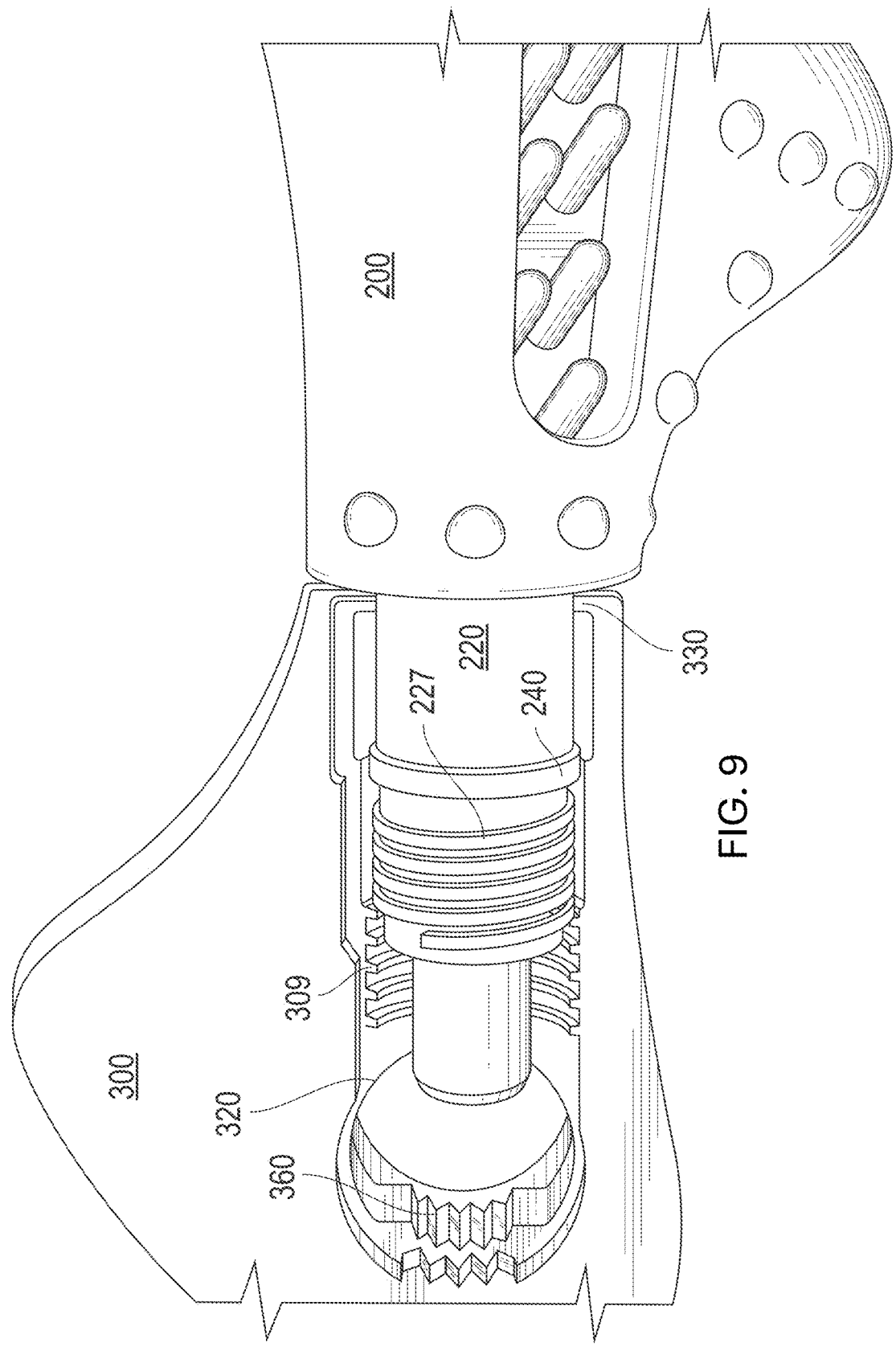
FIG. 9 illustrates a cross-sectional view of portion of the chew toy.
Figure 10:
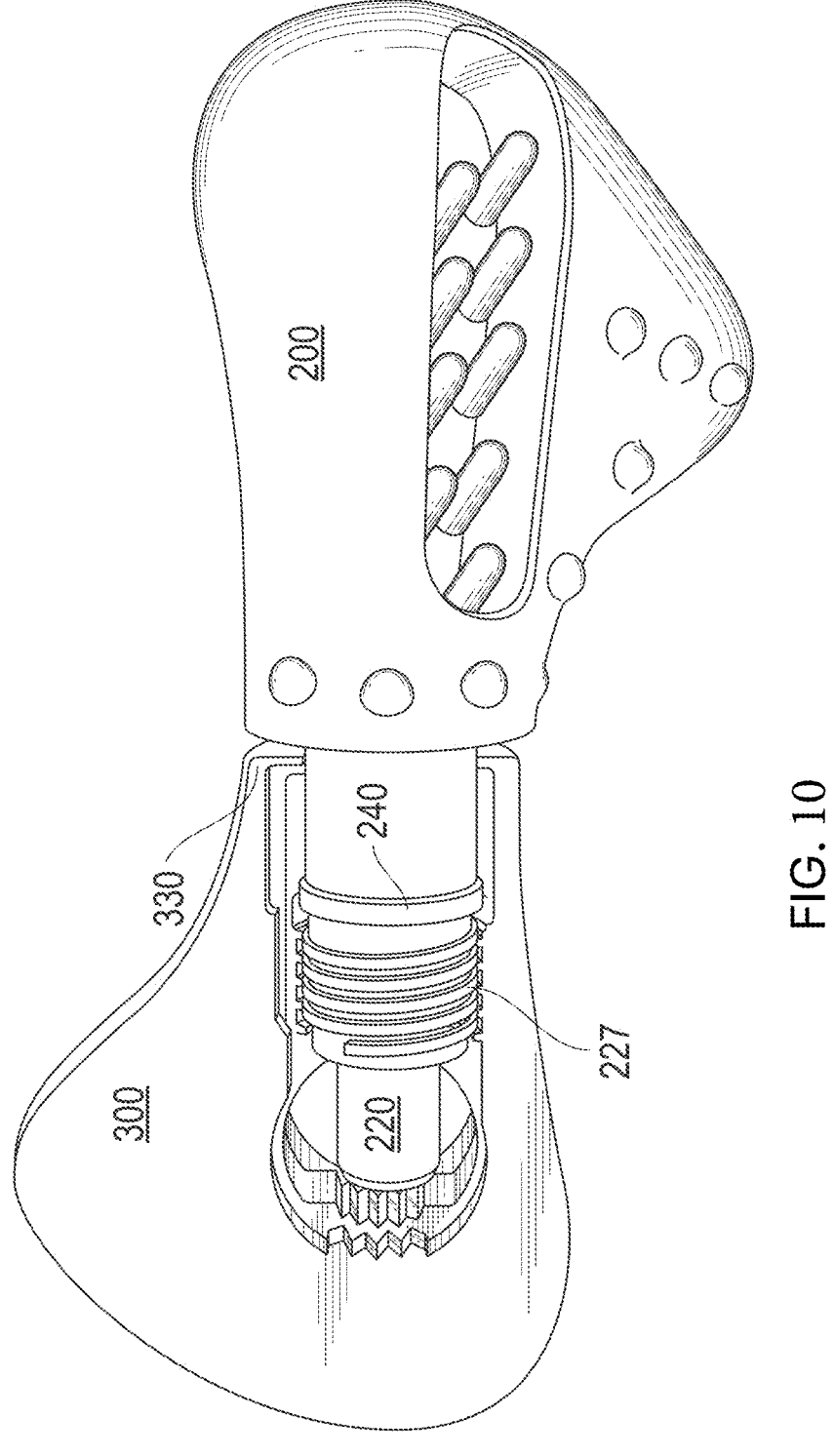
FIG. 10 illustrates another cross-sectional view of portion of the chew toy.
Figure 11:
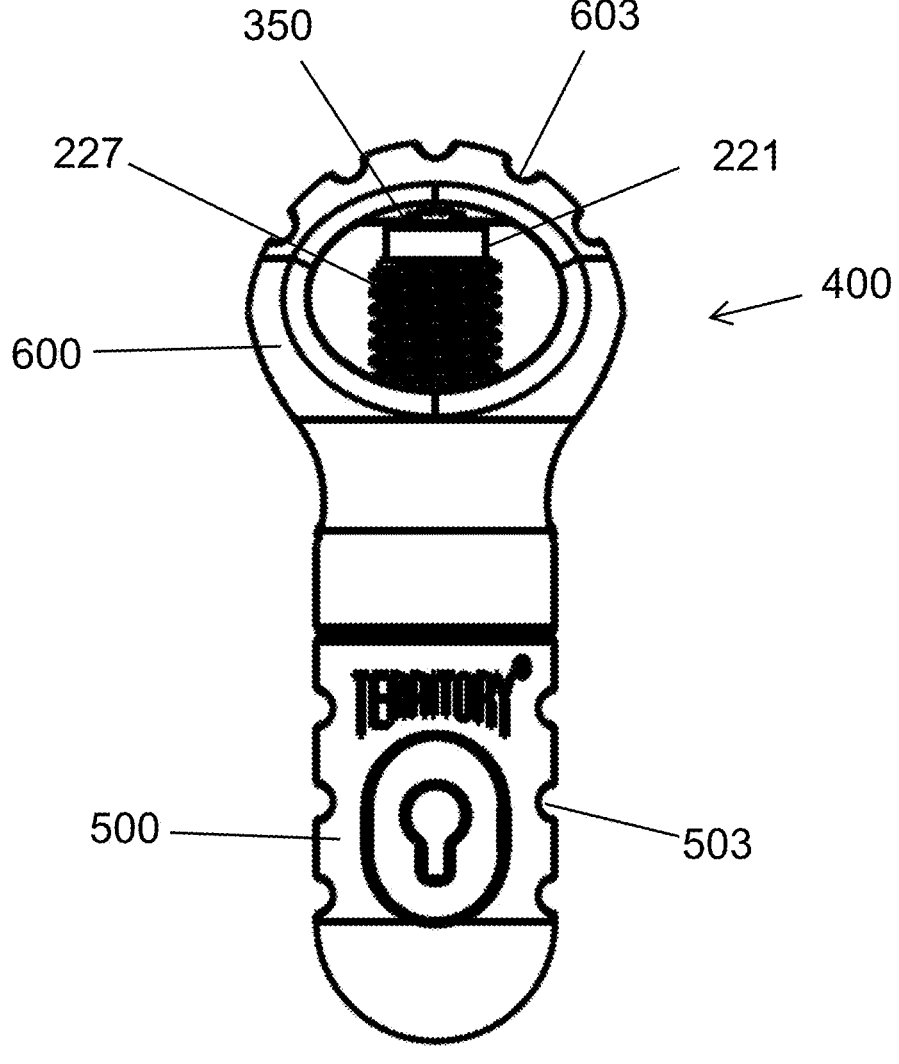
FIGS. 11-15 illustrate a chew toy according to another embodiment and being shown in a fully retracted position.
Figure 12:
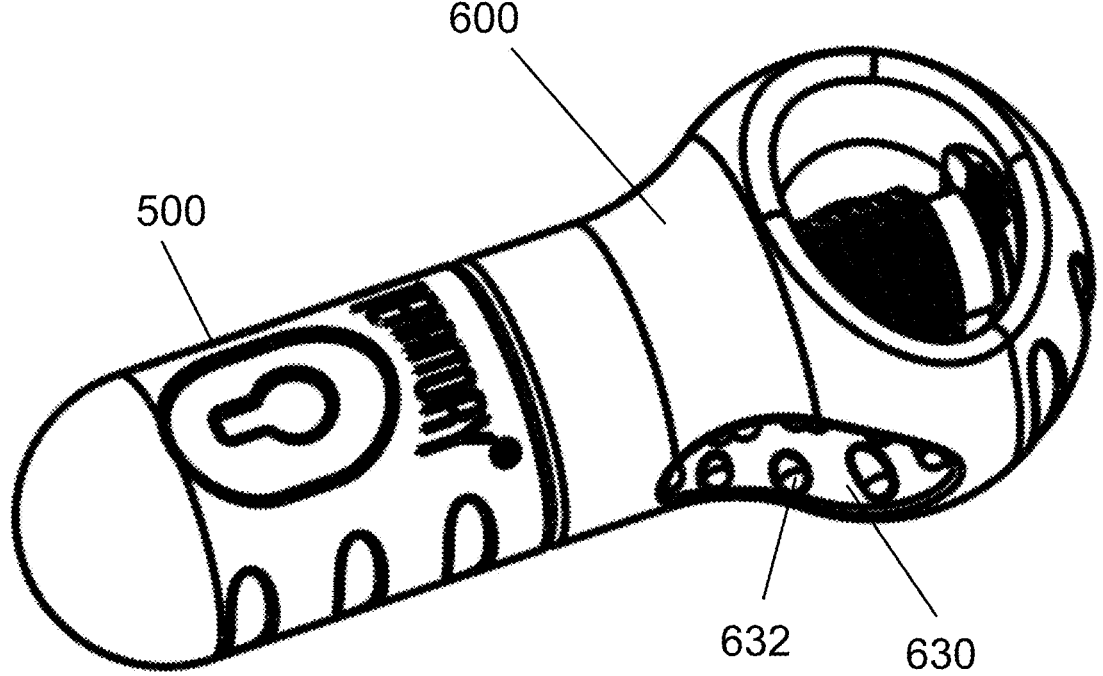
Figure 13:
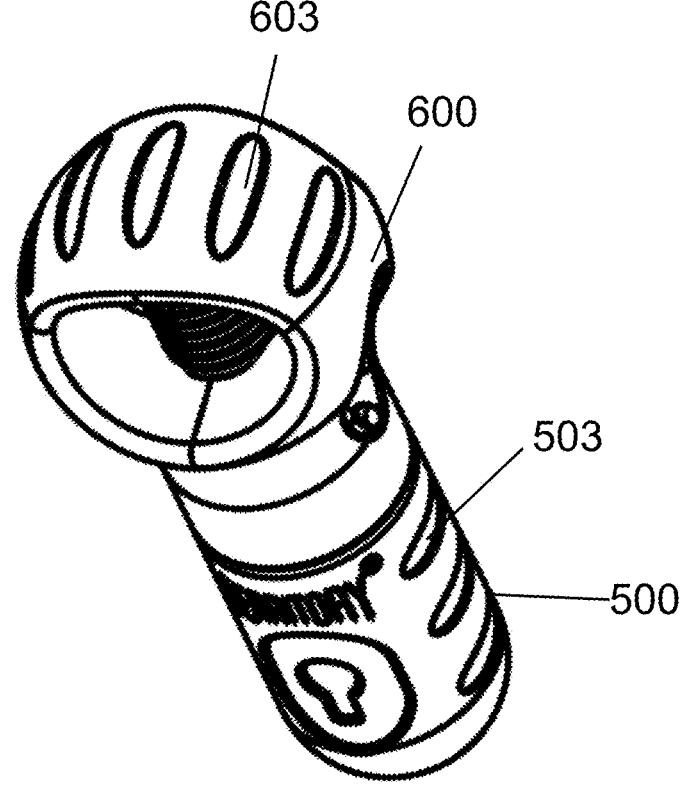
Figure 14:
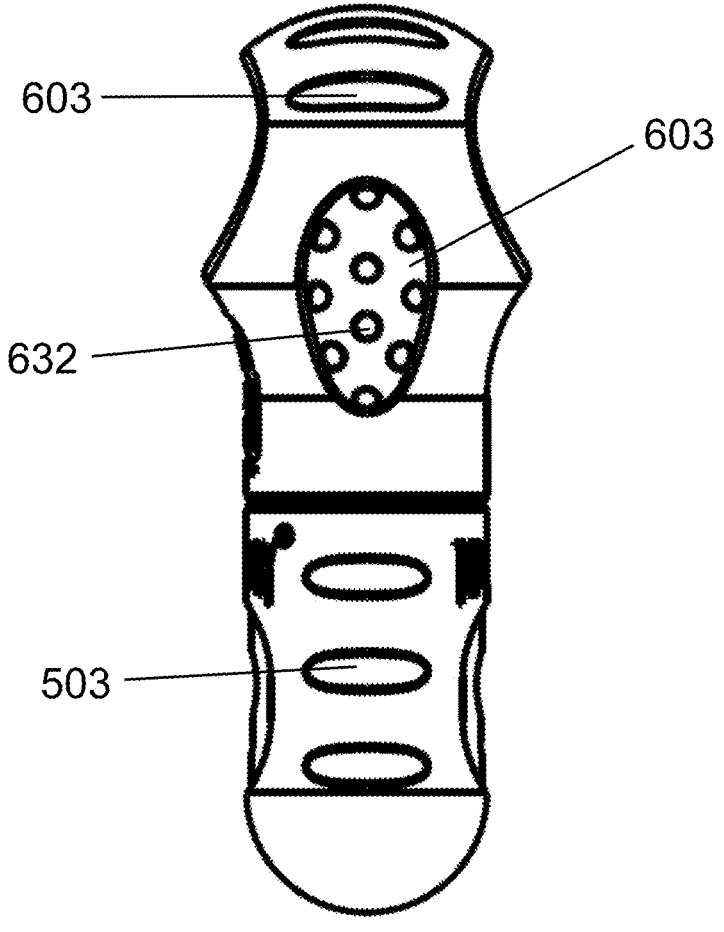
Figure 15:
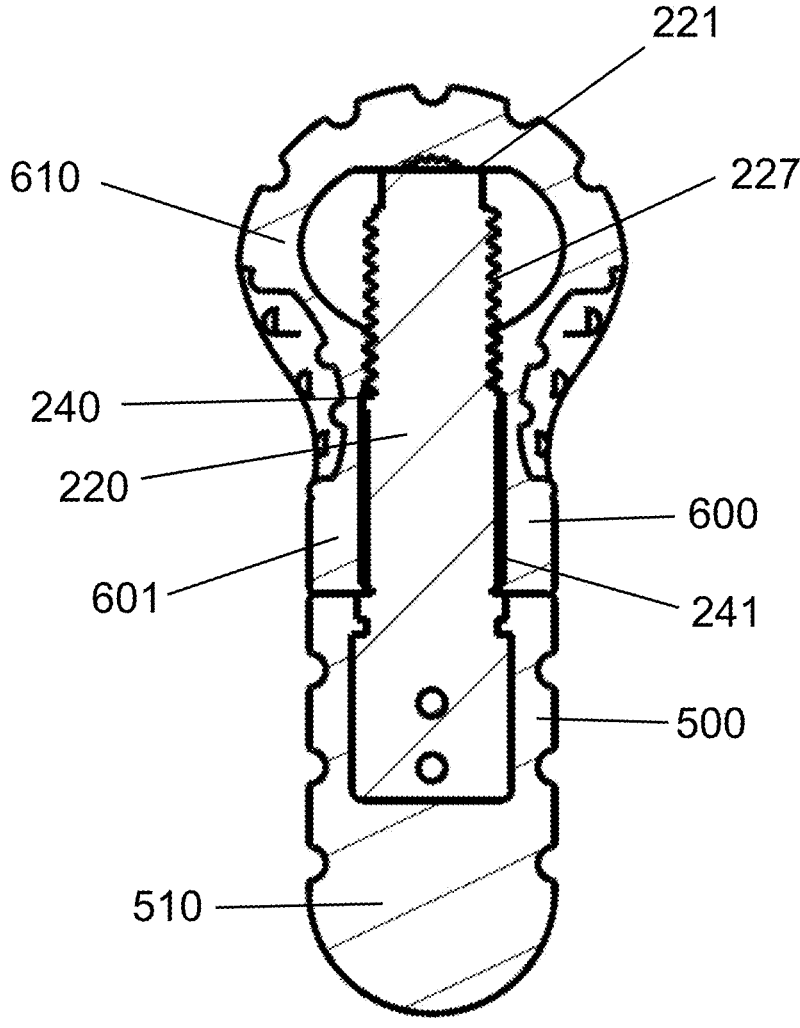
Figures 16, 17:
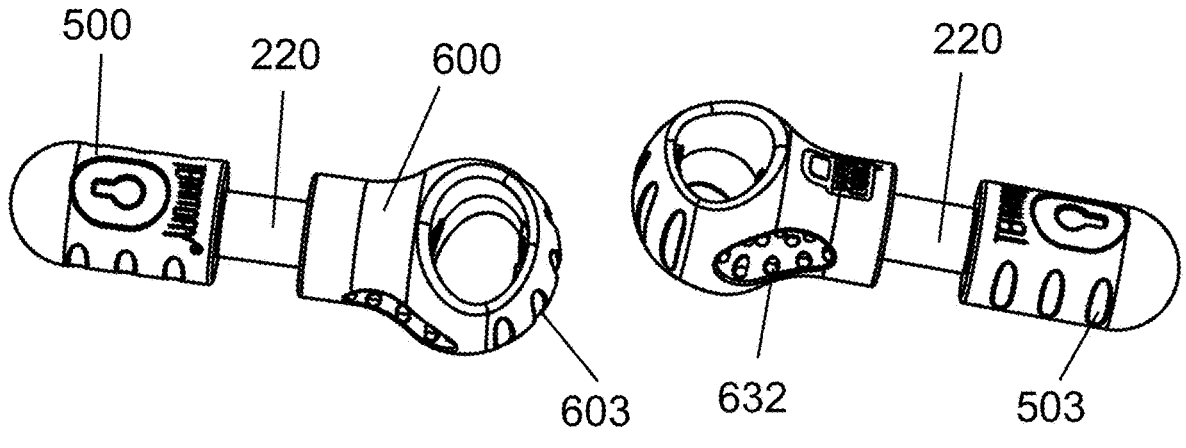

Details of the retaining lip 240 are also shown in FIG. 9 which illustrates the chew toy 100.

Second Part 600

The second part 600 is an elongated hollow part that has a first end and an opposing second end. The second part 600 has a main end portion 610 and an elongated stem-like portion that extends outwardly from the main end portion 610. The main end portion 610 functions as a chew part and can include tactile features which are described in more detail hereinbelow. The second part 600 can be considered to be a female part of the treat-dispensing mechanism.

More specifically, the second part 600 is a hollow part in that it includes a first opening or first bore 601 at the second end. The first bore 601 is elongated in nature and extends longitudinally within the second part 600. The first bore 601 can have a cylindrical shape. The first bore 601 can be defined by different sections and more particularly, can be defined by a first section and a second section. The first bore 601 is open at the second end and the second section is adjacent to this opening of the first bore 601 at the second end. The first section can comprise a threaded section defined by inner threads 609. The inner threads 609 are integrally formed in the second part 600. The inner threads 609 are complementary to the outer threads 227 of the post 220 to allow the post 220 to threadingly mate with the second part 600. In other words, the post 220 can be screwed onto the second part 600 as described herein.

As shown and similar to the chew toy 100, the first section has dimensions that are less than dimensions of the second section and more particularly, the first section has dimensions that are less than the second section. As shown, the second section lacks any threads and can have an unadorned, smooth surface.

The second section has an inner retaining flange 330 that is formed at the second end 304. In other words, the inner retaining flange 330 is formed at the opening of the first bore 301. The inner retaining flange 330 can be in the form of an annular shaped protrusion that extends continuously around the inner wall that defines the first bore 601. The inner retaining flange 330 can be continuous and uninterrupted in shape; however, it can also comprise a segmented structure that is formed of two or more arcuate shaped structures that define a segmented ring. The inner retaining flange 330 is also shown in FIG. 9 with respect to the chew toy 100.

The inner retaining flange 330 and the retaining lip 240 are formed in view of one another in that the inner retaining flange 330 acts as a stop and limits and restricts movement of the post 220 in one direction. The inner retaining flange 330 thus defines one end of travel of the post 220 and thus, defines maximum separation of the two main end portions of the first and second parts 200, 300. More specifically, the retaining lip 240 is unable to clear the inner retaining flange 330 and thus, the first and second parts 500, 600 are inseparably coupled to one another. Once coupled together, in the manner described herein, the first and second parts 500, 600 cannot be separated from one another since the retaining lip 240 contacts the inner retaining flange 330 and cannot move past the inner retaining flange 330 in a direction that would separate the two parts 500, 600.

The second part 600 also includes a transverse opening 320 that is a through hole that extends transversely through the main end portion 610 in that the transverse opening 320 is open along the first and second side faces of the main end portion 610. In the illustrated embodiment, the transverse opening 320 has a circular shape; however, the transverse opening 320 can have other shapes. As described herein, the transverse opening 320 is designed to hold a treat and since it is a through hole, the ends of the treat can protrude outwardly from the two opposing sides (faces) of the main end portion 610.

In addition, the interior wall of the transverse opening 320 can have a grip feature or holder 350 that assists in holding the treat within the transverse opening 320.

The main end portion 610 can include at least one tactile feature and can include a plurality of different tactile features formed as part thereof. In the illustrated embodiment, the main end portion 610 can include a plurality of recessed sections 603. In the illustrated embodiment, the recessed sections 603 formed along the curved end the second part 600. Each recessed section 603 can be in the form of a groove or channel.

The main end portion 610 and or the stem portion of the second part 600 can include one or more recessed areas (channels) 630 for additional treat holding capability and/or holding spreads. Each recessed area 630 can be in the form of an elongated trough. The recessed area 630 itself includes raised protrusions (ribs or dentures) 632. As shown, each recessed area 630 can be defined by a first side wall and a second side wall located parallel to and across from the first side wall. One row of raised protrusions 632 can be formed along or proximate to the first side wall and another row of raised protrusions 632 can be formed along or proximate to the second side wall. The raised protrusions 632 formed along the first and second side walls are offset from one another in that they are not formed directly opposite one another. This orientation of the raised protrusions 632 within the recessed area 630 provides an area that can hold an object, such as a treat or the like. For example, a treat can be placed into the trough and retained between and by the raised protrusions 632 on the opposite side walls.

In the illustrated embodiment, there are two recessed areas on opposite sides of the second part 600.

Initial Coupling of the First and Second Parts 500, 600

To initially couple the first and second parts 500, 600, the post 220 is received within the female portion (first bore) of the second part 600 and the first and second parts 500, 600 are joined together. This initial coupling can be performed at the point of manufacturing. The end user thus does not perform this operation and instead is supplied to the product in its coupled state. In one embodiment, the first and second parts 500, 600 can be joined as whole parts or alternatively, the first and second parts 500, 600 can be joined with one of the parts 500, 600 being itself in multiple parts that are later joined together. For example, the second part 600 can initially be formed as two parts (e.g., two halves) and the first part 500 is inserted between these two halves, which are then subsequently joined together (e.g., as by bonding (adhesive, heat seal, sonic welding, etc.).

The chew toy 400, like the chew toy 100, is intended to be supplied in its coupled state and during normal use, the two parts 500, 600 cannot be separated (uncoupled). This provides safety advantages in that the toy 400 remains as one and does not break down into smaller parts and also it provides convenience to the user in that by remaining intact, the parts 500, 600 cannot be separated and lost.

It will therefore be appreciated that the chew toy 400 is very similar to the chew toy 100 and functions in the same way.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A chew toy comprising:
   a first part having an elongated threaded post; and
   a second part having a threaded bore that receives the threaded post, the second part having a transverse opening formed therein that is in communication with the threaded bore and is configured to receive an object that can be held therein by a force applied by the threaded post;
   wherein the first part and the second part rotate relative to one another and have a range of axial movement relative to one another but the threaded post is inseparably coupled to and contained within the threaded bore due to a shape of one end of the second part that receives the threaded post and due to a shape of an middle section of the elongated threaded post which prevents separation of the first part from the second part.

2. A chew toy comprising:
   a first part having an elongated threaded post; and
   a second part having a threaded bore that receives the threaded post, the second part having a transverse opening formed therein that is in communication with the threaded bore and is configured to receive an object that can be held therein by a force applied by the threaded post;
   wherein the first part and the second part rotate relative to one another and have a range of axial movement relative to one another but the threaded post is inseparably coupled to and contained within the threaded bore;
   wherein the threaded post includes a retaining lip that extends radially outward from the post and an interior wall of the threaded bore has an inner retaining flange, the retaining lip being captured between the inner retaining flange and one end of the threaded bore, thereby preventing separation of the first part and the second part.

3. The chew toy of claim 2, wherein the first part has a main end portion with the threaded post extending outwardly from the main end portion, the main end portion having a plurality of raised protrusions formed along an outer surface thereof.

4. The chew toy of claim 3, wherein the main end portion has at least one recessed area for holding a treat or spread, the at least one recessed area having a plurality of raised protrusions formed therein.

5. The chew toy of claim 4, wherein the recessed area is defined by a first side wall and an opposing second side wall spaced from and parallel to the first side wall, the plurality of raised protrusions comprising a first row of raised protrusions formed along or proximate to the first side wall and a second row of raised protrusions formed along or proximate to the second side wall.

6. The chew toy of claim 5, wherein the first row of raised protrusions are offset from the second row of raised protrusions in that the first and second rows of raised protrusions are not formed directly opposite one another.

7. The chew toy of claim 3, wherein a first shoulder is defined between the main end portion and the threaded post, the post includes a first section that is adjacent to the first shoulder and is free of outer threads.

8. The chew toy of claim 2, wherein the retaining lip comprises a continuous ring and the inner retaining flange comprises a continuous ring.

9. The chew toy of claim 2, wherein the threaded post has a stepped construction and has a distal end portion that has a width less than an adjacent threaded section of the threaded post that includes outer threads.

10. The chew toy of claim 2, wherein the transverse opening is defined by an interior wall that has a grip feature formed there along, the grip feature being disposed opposite the distal end portion of the post to allow the object to be held between the distal end portion and the grip feature.

11. The chew toy of claim 10, wherein the grip feature comprises a plurality of teeth formed along a concave surface.

12. The chew toy of claim 2, wherein a center axis of the transverse opening is perpendicular to a longitudinal axis of the threaded post.

13. The chew toy of claim 2, wherein the second part has a main end portion with the threaded bore formed therein and being open at one end of the second part.

14. The chew toy of claim 2, wherein the first and second parts move between a fully retracted position in which the first and second parts are not separated and a fully extended position in which the first and second parts are separated a maximum distance.

15. The chew toy of claim 14, wherein the first part includes a main end portion from which the threaded post extends with a shoulder defined between the main end portion and the threaded post, wherein in the fully retracted position, the shoulder abuts an end of the second part and a distal end portion of the threaded post is disposed within the transverse opening.

16. The chew toy of claim 2, wherein the transverse opening is a cylindrical shape and the threaded post has a cylindrical shape.

17. A chew toy comprising:
a first part having an elongated threaded post; and
a second part having a threaded bore that receives the threaded post, the second part having a transverse opening formed therein that is in communication with the threaded bore and is configured to receive an object that can be held therein by a force applied by the threaded post;
wherein the first part and the second part rotate relative to one another and have a range of axial movement relative to one another but the threaded post is inseparably coupled to and contained within the threaded bore;
wherein the first and second parts move between a fully retracted position in which the first and second parts are not separated and a fully extended position in which the first and second parts are separated a maximum distance;
wherein the first part includes a main end portion from which the threaded post extends with a shoulder defined between the main end portion and the threaded post, wherein in the fully retracted position, the shoulder abuts an end of the second part and a distal end portion of the threaded post is disposed within the transverse opening;
wherein in the fully extended position, the distal end portion of the threaded post is withdrawn from the transverse opening and the shoulder is spaced from the end of the second part.

18. The chew toy of claim 17, wherein the threaded post includes a retaining lip that extends radially outward from the post and an interior wall of the threaded bore has an inner retaining flange, the retaining lip being captured between the inner retaining flange and one end of the threaded bore, thereby preventing separation of the first part and the second part, and wherein the first and second parts move between a fully retracted position in which the first and second parts are not separated and a fully extended position in which the first and second parts are separated a maximum distance, wherein in the fully retracted position, the retaining lip is spaced from the inner retaining flange and in the fully extended position, the retaining lip is in contact with inner retaining flange.

19. The chew toy of claim 18, wherein in the fully retracted position, one of the first and second parts is configured and oriented to lie flush on a flat surface, while the other of the first and second parts is positioned at an angle less than 90 degrees relative to the flat surface.

20. A chew toy comprising:
a first part having an elongated threaded post; and
a second part having a threaded bore that receives the threaded post, the second part having a transverse opening formed therein that is in communication with the threaded bore and is configured to receive an object that can be held therein by a force applied by the threaded post;
wherein the first part and the second part rotate relative to one another and have a range of axial movement relative to one another, but the threaded post is inseparably coupled to and contained within the threaded bore;
wherein the threaded post includes a retaining lip that extends radially outward from the post and an interior wall of the threaded bore has an inner retaining flange, the retaining lip being captured between the inner retaining flange and one end of the threaded bore, thereby preventing separation of the first part and the second part.

21. A chew toy comprising:
a first part having a first end portion; and
a second part having a second end portion;
wherein the first part and the second part are shaped such that when one of the first end portion and the second end portion lies stable on a ground surface, the other of the first end portion and the second end portion is upright at an angle to the ground surface, whereby application of a downward force to one of the first end portion and the second end portion causes a lifting of the other of the first end portion and the second end portion;
wherein the first part has an elongated threaded post and the second part has a threaded bore that receives the threaded post, the second part having a transverse opening formed therein that is in communication with the threaded bore and is configured to receive an object that can be held therein by a force applied by the threaded post;
wherein the first part and the second part rotate relative to one another and have a range of axial movement relative to one another but the threaded post is inseparably coupled to and contained within the threaded bore;
wherein the threaded post includes a retaining lip that extends radially outward from the post and an interior wall of the threaded bore has an inner retaining flange, the retaining lip being captured between the inner retaining flange and one end of the threaded bore, thereby preventing separation of the first part and the second part.

22. The chew toy of claim 21, wherein the retaining lip comprises a continuous ring and the inner retaining flange comprises a continuous ring.

23. The chew toy of claim 21, wherein the threaded post has a stepped construction and has a distal end portion that has a width less than an adjacent threaded section of the threaded post that includes outer threads.

24. The chew toy of claim 21, wherein the transverse opening is defined by an interior wall that has a grip feature formed therealong, the grip feature being disposed opposite the distal end portion of the post to allow the object to be held between the distal end portion and the grip feature.

25. The chew toy of claim 21, wherein the first end portion includes a first protruding section and the second end portion includes a second protruding section, wherein when the first and second parts are in a fully retracted position, the first protruding section faces in a first direction and the second protruding section faces in a second direction that is different than the first direction.

26. The chew toy of claim 25, wherein the first and second directions are generally opposite one another.

27. The chew toy of claim 21, wherein the angle is less than 90 degrees.

28. The chew toy of claim 21, wherein the ground surface is flat.

29. The chew toy of claim 21, wherein the second end portion has a transverse opening formed therein that is configured to receive and hold an object that is at a second angle relative to the ground surface when the second end portion lies stable on a ground surface, wherein the angle of the first end portion is an angle selected such that when the first end portion transitions to position at which it lies stable on the ground surface, the second angle changes.

30. The chew toy of claim 29, wherein a degree of change of the second angle is 60 degrees or less.

31. The chew toy of claim 29, wherein a degree of change of the second angle is 45 degrees or less.

* * * * *